No. 823,369. PATENTED JUNE 12, 1906.
F. W. SCHROEDER.
SPEED GEARING.
APPLICATION FILED OCT. 13, 1903.
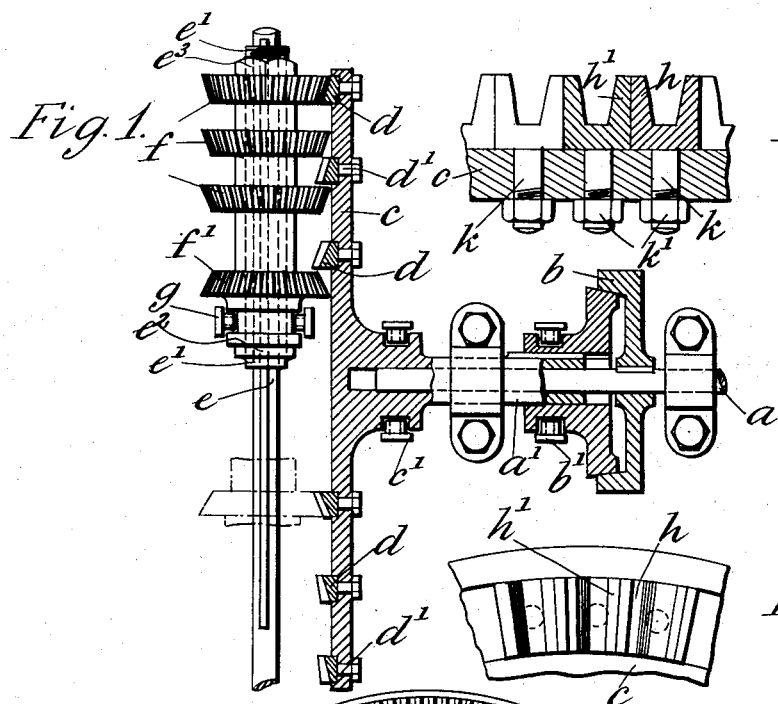
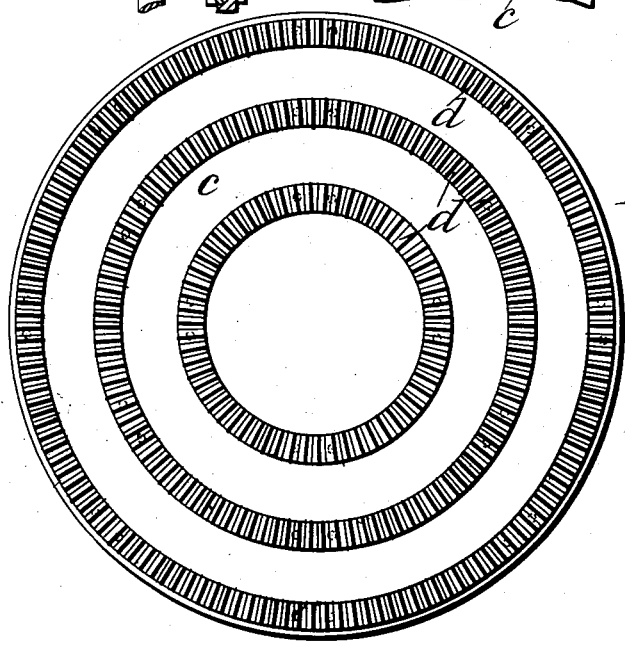
WITNESSES
INVENTOR
F. W. Schroeder

UNITED STATES PATENT OFFICE.

FREDERICK WILLIAM SCHROEDER, OF LONDON, ENGLAND.

SPEED-GEARING.

No. 823,369.  Specification of Letters Patent.  Patented June 12, 1906.

Application filed October 13, 1903. Serial No. 176,868.

*To all whom it may concern:*

Be it known that I, FREDERICK WILLIAM SCHROEDER, a subject of the King of Great Britain and Ireland, residing at 9 Arundel street, Strand, in the county of London, England, have invented certain new and useful Speed-Gearing, of which the following is a specification.

My invention is designed to provide improved gearing by which the speed of a driven shaft can be varied in definite steps with a constant speed of the driving-shaft.

In the accompanying drawings, Figure 1 is a longitudinal section, partly in elevation, of a variable-speed gear constructed according to this invention. Fig. 2 is an elevation of the face of the driving-disk; and Figs. 3 and 4 are detail views, drawn to a larger scale, showing a construction of the rings of teeth in the driving-disk.

A sleeve $a'$, mounted loosely on a shaft $a$, is arranged to be connected to the latter by means of a clutch $b$, sliding on a feather on the sleeve and operated in the usual manner by a forked lever $b'$, engaging in an annulus on the boss of the clutch. On the other end of the sleeve $a'$ is a disk $c$, also arranged to be slid on a feather on the sleeve by means of a forked lever $c'$. This disk is provided with two or more rings $d$ of bevel-teeth, these rings being fitted, preferably, in sections in grooves on the face of the disk concentric with its axis and secured by passing shanks $d'$, which are formed with or fixed to the ring-segments, through holes in the disk and fastening them with nuts.

On a sleeve $e'$, which slides on a feather on the shaft $e$, the axis of which intersects orthogonally the axis of the shaft $a$, are removably-fixed conical-toothed wheels $f$, equal in number to the rings of teeth on the disk and cut to gear with these each to each when on one and the same side of the disk center. An additional conical-toothed wheel $f'$ is mounted with the others and cut to gear with one of the rings of teeth on the disk, preferably the inner ring, when on the other side of the disk center for reverse driving, as shown in dotted lines in Fig. 1. The wheels $ff'$ are preferably formed with bosses which serve as distance-pieces when the wheels are strung together on a feather on the sleeve $e'$ and secured thereon between the collar $e^2$ and the nut $e^3$ on the sleeve. The boss of the conical wheel $f'$ is formed with a groove in which the lever $g$ engages for the purpose of sliding the sleeve $e'$, together with the wheels $ff'$, into such positions that each wheel may engage with its corresponding ring of teeth in the disk. The wheels $ff'$ and the rings of teeth $d$ are so spaced that when any one of the wheels is in gear the others are out of gear.

The rings of teeth are preferably, as already described, attached to the disk in segments, and in Figs. 3 and 4 there is shown a convenient arrangement in which each segment consists of two half-teeth $h$ $h'$ and a shank $k$ for attachment to the disk. The outsides of these sections are formed with a very slight taper, so that when two sections are drawn up by their nuts $k'$ the contiguous surfaces are wedged tightly together.

Having thus described the nature of my said invention and the best means I know of carrying the same into practical effect, I claim—

1. A speed-gearing comprising a disk having a plurality of concentric rows of teeth, an endwise-movable sleeve carrying the disk, a shaft at right angles to the axis of the disk, a sleeve arranged to slide on said shaft, pinions secured on the latter sleeve equal in number to and adapted to engage with the rows of teeth on the disk, each with each, an additional pinion on the pinion-sleeve adapted to engage with one of the rows of teeth on the opposite side of the disk-axis, said pinions being spaced to allow only one of them to mesh with the teeth on the disk at one time, means for withdrawing the disk-teeth from engagement with the pinions, and means for sliding the pinion-sleeve along its shaft; substantially as described.

2. A speed-gearing comprising a disk having a plurality of rows of teeth attached to the said disk in segments, concentric with its axis, an endwise-movable sleeve carrying the disk, a shaft at right angles to the axis of the disks, a sleeve arranged to slide on the shaft, pinions secured on the latter sleeve equal in number to and adapted to engage with the rows of teeth on the disk, each with each, an additional pinion on the said sleeve adapted to engage with one of the rows of teeth on the opposite side of the disk-axis, the said pinions being spaced to allow only one of them to mesh with the teeth on the disk at one time, means for withdrawing the teeth on the disk from engagement with the pinions, and means for sliding the pinion-sleeve along its shaft; substantially as described.

3. A speed-gearing comprising an endwise-movable disk having a plurality of rows of teeth concentric with its axis and attached to said disk in segments each segment consisting of two half-teeth and a shank, the junction-faces of said segments being tapered, a shaft, a slidable sleeve on said shaft, a plurality of pinions on said sleeve, each adapted to engage one of the rows of disk-teeth, one of said pinions being arranged to drive said shaft in a reverse direction, and means for sliding said disk and said pinion-sleeve; substantially as described.

In testimony whereof I have signed my name to this specification in the presence of two subscribing witnesses.

FREDERICK WILLIAM SCHROEDER.

Witnesses:
J. MILLARD,
EDWARD GARDNER.